United States Patent
Singla et al.

(10) Patent No.: US 9,485,194 B2
(45) Date of Patent: *Nov. 1, 2016

(54) VIRTUAL LINK AGGREGATION OF NETWORK TRAFFIC IN AN AGGREGATION SWITCH

(71) Applicants: Ankur Singla, San Carlos, CA (US); Harshad Nakil, San Jose, CA (US); Rajashekar Reddy, San Jose, CA (US); Hampapur Nagaraj Ajay, San Jose, CA (US)

(72) Inventors: Ankur Singla, San Carlos, CA (US); Harshad Nakil, San Jose, CA (US); Rajashekar Reddy, San Jose, CA (US); Hampapur Nagaraj Ajay, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/892,702

(22) Filed: May 13, 2013

(65) Prior Publication Data

US 2013/0243008 A1 Sep. 19, 2013

Related U.S. Application Data

(63) Continuation of application No. 12/727,751, filed on Mar. 19, 2010, now Pat. No. 8,442,064.

(51) Int. Cl.
*H04L 12/931* (2013.01)
*H04L 12/933* (2013.01)
*H04L 12/709* (2013.01)

(52) U.S. Cl.
CPC ............. *H04L 49/00* (2013.01); *H04L 49/10* (2013.01); *H04L 49/70* (2013.01); *H04L 45/245* (2013.01); *Y02B 60/43* (2013.01)

(58) Field of Classification Search
None
See application file for complete search history.

(56) References Cited

U.S. PATENT DOCUMENTS

| | | | |
|---|---|---|---|
| 7,274,694 B1 * | 9/2007 | Cheng | H04L 45/245 370/389 |
| 7,457,256 B2 * | 11/2008 | Ivaldi | H04L 12/28 370/256 |
| 7,469,295 B1 * | 12/2008 | Gangadharan | H04L 69/14 370/229 |

(Continued)

*Primary Examiner* — Ayaz Sheikh
*Assistant Examiner* — Faiyazkhan Ghafoerkhan
(74) *Attorney, Agent, or Firm* — Harrity & Harrity, LLP

(57) ABSTRACT

Access switches in a switching system may use virtual aggregated links. When a link between an aggregation switch and an access switch fails, the link failure may be reflected in the virtual aggregated link and data traffic to another access switch may be switched away from the failed switch. A forwarding table in the access switch stores a number of entries that each define a correspondence between destination addresses and an output identifier for the switch. At least a first output identifier includes an aggregated link that represents a first set of possible output links. At least a second output identifier includes a virtual aggregated link, associated with a second network switch that represents a second set of possible output links. Destination addresses in the forwarding table for the virtual aggregated link correspond to network devices connected to the second network switch.

20 Claims, 8 Drawing Sheets

(56) References Cited

U.S. PATENT DOCUMENTS

| | | | | |
|---|---|---|---|---|
| 7,719,958 B1* | 5/2010 | Azimi | H04L 12/18 | 370/220 |
| 7,778,275 B2* | 8/2010 | Mani | G06F 9/5077 | 370/229 |
| 7,793,298 B2* | 9/2010 | Billau | G06F 9/5072 | 710/36 |
| 7,869,432 B1* | 1/2011 | Mollyn | H04L 12/4625 | 370/221 |
| 7,881,230 B2* | 2/2011 | Vinayagam | H04L 49/30 | 370/255 |
| 8,204,061 B1* | 6/2012 | Sane | H04L 12/462 | 370/256 |
| 8,971,323 B2* | 3/2015 | Mithyantha | H04L 45/586 | 370/217 |
| 2005/0007951 A1* | 1/2005 | Lapuh | H04L 45/00 | 370/225 |
| 2008/0089235 A1* | 4/2008 | Kotrla | H04L 41/0659 | 370/242 |
| 2008/0205387 A1* | 8/2008 | Wakumoto | H04L 45/245 | 370/389 |
| 2008/0205408 A1* | 8/2008 | Wakumoto | H04L 49/3009 | 370/395.31 |
| 2008/0240133 A1* | 10/2008 | Tanaka | H04L 45/245 | 370/401 |
| 2008/0253295 A1* | 10/2008 | Yumoto | H04L 43/0811 | 370/245 |
| 2008/0285555 A1* | 11/2008 | Ogasahara | H04L 45/00 | 370/389 |
| 2008/0298274 A1* | 12/2008 | Takashige | H04L 12/4641 | 370/254 |
| 2009/0003206 A1* | 1/2009 | Bitar | H04L 12/5695 | 370/230.1 |
| 2009/0086620 A1* | 4/2009 | Fowler | H04L 12/40169 | 370/216 |
| 2009/0141622 A1* | 6/2009 | Bitar | H04L 41/0896 | 370/225 |
| 2009/0141731 A1* | 6/2009 | Bitar | H04L 12/5695 | 370/412 |
| 2009/0185569 A1* | 7/2009 | Yong | H04L 45/00 | 370/395.31 |
| 2009/0208206 A1* | 8/2009 | Madrahalli | H04L 45/02 | 398/45 |
| 2009/0232152 A1* | 9/2009 | Chen | H04L 12/42 | 370/419 |
| 2009/0245112 A1* | 10/2009 | Okazaki | H04L 12/4604 | 370/236 |
| 2009/0323520 A1* | 12/2009 | Kapoor | H04L 41/0681 | 370/225 |
| 2010/0020680 A1* | 1/2010 | Salam | H04L 43/0811 | 370/225 |
| 2010/0157793 A1* | 6/2010 | Sajassi | G06F 11/2007 | 370/228 |
| 2010/0189106 A1* | 7/2010 | Azimi et al. | | 370/390 |
| 2010/0265831 A1* | 10/2010 | Hachiya | H04L 49/3009 | 370/248 |
| 2010/0290473 A1* | 11/2010 | Enduri | H04L 49/70 | 370/395.53 |
| 2010/0329147 A1* | 12/2010 | Nam | H04L 45/00 | 370/254 |
| 2011/0103396 A1* | 5/2011 | Cardona | H04L 45/245 | 370/422 |
| 2011/0161489 A1* | 6/2011 | Bhatt | H04L 45/245 | 709/224 |
| 2011/0228767 A1* | 9/2011 | Singla | H04L 49/00 | 370/389 |

* cited by examiner

FORWARDING TABLE FOR ACCESS SWITCH A2

| MAC | DESTINATION |
|---|---|
| 505 ~ 01-23-45-67-89-AB | PORT 4 |
| 510 ~ 41-36-45-69-90-AF | LAG-A2 [A2N1, A2N2, A2N3, A2N4] |
| 515 ~ 22-45-AE-29-3C-05 | PORT 6 |
| 520 ~ 82-72-45-69-90-AF | LAG-A2 [A2N1, A2N2, A2N3, A2N4] |
| | VLAG-A1 [A2N1, A2N2, A2N3, A2N4] |
| | VLAG-A3 [A2N1, A2N2, A2N3, A2N4] |
| | VLAG-A4 [A2N1, A2N2, A2N3, A2N4] |

FORWARDING TABLE FOR ACCESS SWITCH A2

| MAC | DESTINATION |
|---|---|
| 505 ～ 01-23-45-67-89-AB | PORT 4 |
| 510 ～ 41-36-45-69-90-AF | LAG-A2 [A2N1, A2N2, A2N3, A2N4] |
| 515 ～ 22-45-AE-29-3C-05 | PORT 6 |
| 520 ～ 82-72-45-69-90-AF | LAG-A2 [A2N1, A2N2, A2N3, A2N4] |
| | VLAG-A1 [A2N1, A2N2, A2N3, A2N4] |
| | VLAG-A3 [A2N1, A2N2, A2N3, A2N4] |
| | VLAG-A4 [A2N1, A2N2, A2N3, A2N4] |

FORWARDING TABLE FOR ACCESS SWITCH A2

| MAC | DESTINATION |
|---|---|
| 505 ~ 01-23-45-67-89-AB | PORT 4 |
| 510 ~ 41-36-45-69-90-AF | LAG-A2 [A2N1, A2N2, A2N3, A2N4] |
| 515 ~ 22-45-AE-29-3C-05 | PORT 6 |
| | LAG-A2 [A2N1, A2N2, A2N3, A2N4] |
| 520 ~ 82-72-45-69-90-AF | VLAG-A1 [A2N1, A2N2, A2N4] |
| | VLAG-A3 [A2N1, A2N2, A2N3, A2N4] |
| | VLAG-A4 [A2N1, A2N2, A2N3, A2N4] |

VIRTUAL LINK AGGREGATION OF NETWORK TRAFFIC IN AN AGGREGATION SWITCH

RELATED APPLICATION

This application is a continuation of U.S. patent application Ser. No. 12/727,751, filed Mar. 19, 2010, the disclosure of which is incorporated herein by reference.

BACKGROUND

Computing and communication networks typically include devices, such as routers, switches or gateways, which transfer or switch data, such as packets, from one or more sources to one or more destinations. A packet is a structure that encapsulates data for transmission through a network based on control information that is stored in a header portion of the packet.

A network switch, in particular, may include a networking device that connects network segments and computing devices. Network switches typically process and forward data at the data link (Layer 2) layer of the Open System Interconnection (OSI) model.

In some network switch configurations, multiple access switches may each connect to a number of network devices. For example, a "server farm" may include hundreds or thousands of servers, where each of the servers may connect to a port of one of the access switches. Each of the access switches may in turn connect to one or more aggregation switches. The aggregation switches may be logically combined to appear as a single "virtual" aggregation switch. The virtual aggregation switch may allow network administrators to maintain a single operating system and configuration information for the virtual aggregation switch.

Individual aggregation switches in a virtual aggregation switch may be directly connected to one another. In order to maximize the overall bandwidth of the system, it is desirable that data traffic between the individual aggregation switches is minimized.

SUMMARY

One implementation is directed a network switch that may include a number of input ports to receive data units, the data units including destination addresses each corresponding to an intended network destination for the data units; a number of output ports to transmit the data units from the network switch over a respective plurality of output links; a forwarding table to store entries that each define a correspondence between one of the destination addresses and an output identifier for the network switch, where the output identifier includes an aggregated link that represents a first plurality of possible output links or a virtual aggregated link that represents a second set of possible output links, where the virtual aggregated link is associated with a second network switch; logic to receive information indicating that a link corresponding to the second network switch has failed; and logic to, in response to receiving the information indicating that the link corresponding to the second network switch has failed, remove selected output links of the second plurality of possible output links from the virtual aggregated link.

Another implementation may be directed to a network switch that includes a number of import ports to receive data units, the data units including destination addresses each corresponding to an intended network destination for the data units; a number of output ports to transmit the data units from the network switch over a respective set of output links; and a forwarding table to store entries that each define a correspondence between one of the destination addresses and an output identifier for the network switch, where at least a first one of the output identifiers includes an aggregated link that represents a first set of possible output links, and where at least a second one of the output identifiers includes a virtual aggregated link, associated with a second network switch, that represents a second set of possible output links, where destination addresses in the forwarding table for the virtual aggregated link correspond to network devices connected to the second network switch.

In yet another implementation, a method may include creating, at a switch in a network, an aggregated link that represents a first set of possible output links from the switch; receiving, at the switch in the network, a virtual aggregated link, associated with a second switch, the virtual aggregated link representing a second set of possible output links from the switch; implementing, by the switch, a forwarding table that stores correspondences between MAC addresses and the aggregated link and between the MAC addresses and the virtual aggregated link; updating, at the switch in the network and in the forwarding table, in response to received update information, correspondences between MAC addresses of computing devices connected to the second switch and the virtual aggregated link; and outputting data units received by the switch at an output port determined based on a lookup into the forwarding table.

BRIEF DESCRIPTION OF THE DRAWINGS

The accompanying drawings, which are incorporated in and constitute a part of this specification, illustrate one or more implementations described here and, together with the description, explain these implementations. In the drawings:

FIG. 5 is a diagram conceptually illustrating a portion of an exemplary forwarding table for an access switch;

FIG. 6 is a diagram conceptually illustrating a portion of an exemplary forwarding table after updating a media access control (MAC) address to correspond to a virtual aggregated link;

FIG. 7 is a diagram conceptually illustrating a portion of the exemplary forwarding table shown in FIG. 6 after updating the memberships of the virtual aggregated link.

DETAILED DESCRIPTION

The following detailed description of the invention refers to the accompanying drawings. The same reference numbers in different drawings may identify the same or similar elements. Also, the following detailed description does not limit the invention.

As described herein, links from an access switch to a number of aggregation switches may be aggregated and stored in a forwarding table of the access switch as a single aggregated link. Aggregated links from other access switches may also be stored in the forwarding table as virtual aggregation links. When a link between an aggregation switch and another access switch fails, the link failure may be reflected in the virtual aggregated link. Because the link failure is reflected in the virtual aggregated link, data traffic to the other access switch may be switched away from the failed link.

Exemplary System Overview

Figure 1:
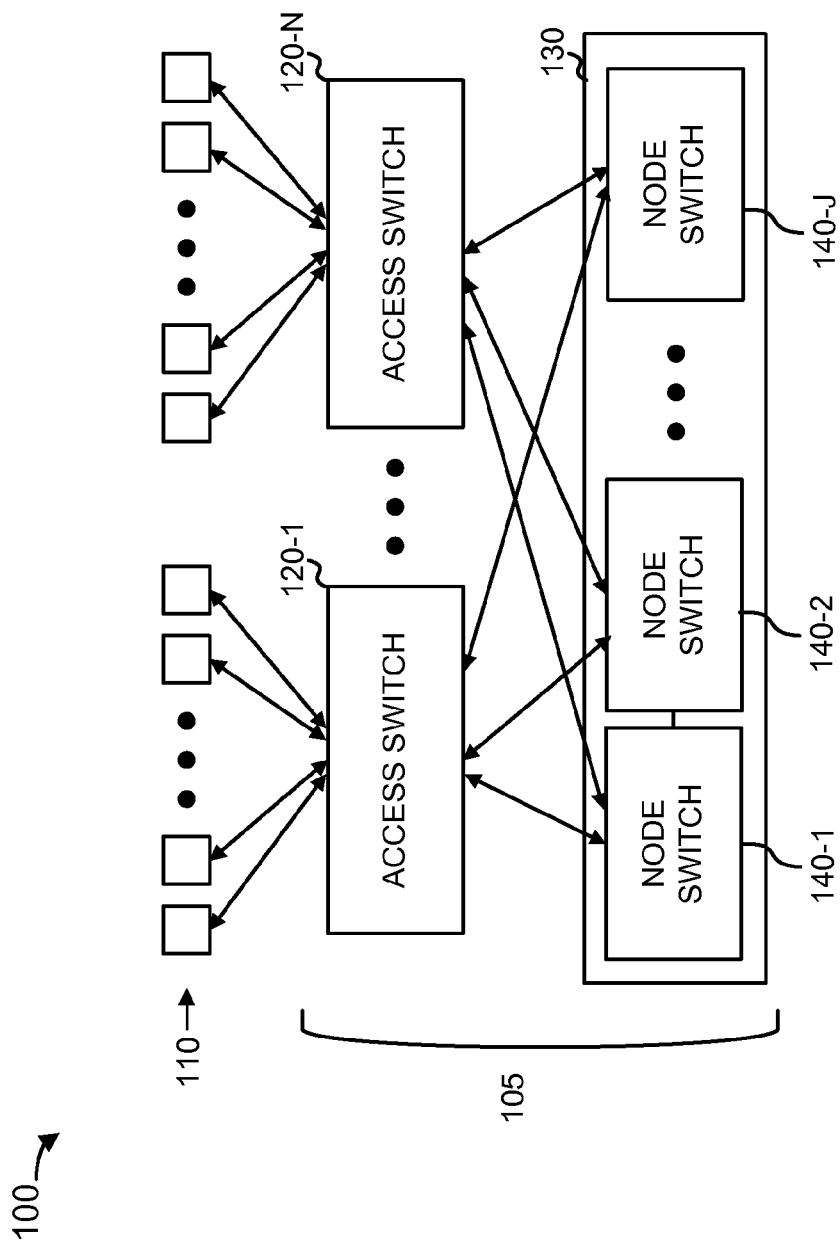
FIG. 1 is a diagram of an exemplary system in which concepts described herein may be implemented.

FIG. 1 is a diagram of an exemplary system 100 in which concepts described herein may be implemented. System 100 may include a switching system 105 connected to a number of client computing or networking devices 110. Each device 110 may be for example, a client or server computing device, or a network device such as a gateway to another network. The number or locations of devices 110 may be such that a single switch may not be able to feasibly service all of devices 110. Accordingly, switching system 105 may include a number of hierarchically arranged switches. The switches in switching system 105 may switch data units at least at the Layer 2 network layer in the OSI network model.

Switching system 105 may include a chassis 130 that connects to N access switches 120-1 through 120-N (collectively referred to as "access switches 120" and singularly as "access switch 120"). Access switches 120 may be edge switches designed to connect to computing devices, such as devices 110. In one implementation, each access switch 120 may include, for example, forty-eight (48) ports designed to connect to devices 110. Each access switch 120 may also include a number of ports, such as eight, designed to connect to chassis 130. The upstream ports to chassis 130 may support higher bandwidth links than the links to devices 110. For example, each upstream port to chassis 130 may be an 10 GE (10 gigabit Ethernet) port, while ports to devices 110 may be 1 GE.

Chassis 130 may be a "virtual" chassis designed to house one or more aggregation (node) switches 140-1 through 140-J (collectively referred to as "node switches 140" and singularly as "node switch 140"). The number of node switches 140 placed in chassis 130 may be user configurable up to a maximum number. Thus, an administrator could potentially add additional node switches 140 as needed to chassis 130. Node switches 140 may generally include higher capacity switches than access switches 120.

In one implementation, each access switch 120 may be connected (linked) to each node switch 140. Nodes switches 140 may also be connected to one another. For example, as shown in FIG. 1, neighboring node switches 140-1 and 140-2 may be connected to one another. Links between node switches 140 may be used for control and data traffic. Ideally, the links between node switches 140 may be used as much as possible for control traffic while minimizing the use of the links for data traffic. In operation, data units received from a computing device 110 connected to an access switch, such as access switch 120-1, and destined for a computing device 110 connected to another access switch, such as access switch 120-N, may be switched from access switch 120-1 to one of node switches 140 and then to access switch 120-N.

Exemplary Switch Architecture

Figure 2:
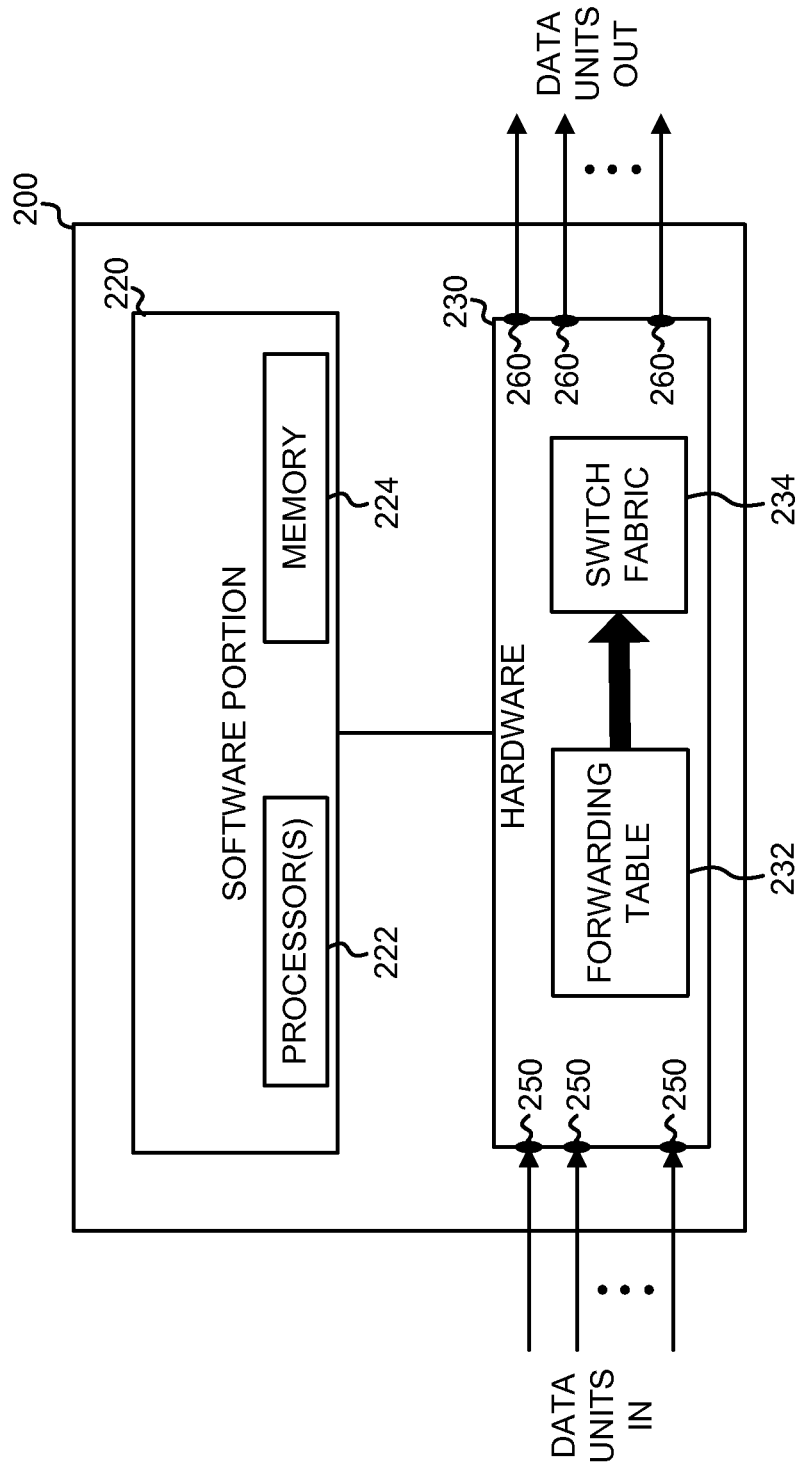
FIG. 2 is a diagram illustrating an exemplary switch which may correspond to one of the switches shown in FIG. 1.

FIG. 2 is a diagram illustrating an exemplary switch 200, which may correspond to one of switches 120 or 140.

As previously mentioned, switch 200 may perform network switching at the Layer 2 network layer. Switching at the Layer 2 layer may generally include looking up destination addresses, such as addresses specified by a MAC address and/or a virtual local area network (VLAN) identifier, associated with an incoming data unit. The lookup may determine the appropriate output port or link for the data unit. The lookup may be based on a forwarding table that is updated based on one or more link layer protocols executed by switch 200.

As shown in FIG. 2, switch 200 may include a software portion 220 and a hardware portion 230. Software portion 220 may include software designed to control switch 200. Software portion 220 may, for example, implement an operating system for switch 200 and may execute processes designed to implement the network protocols used by switch 200. Software portion 220 may control hardware portion 230 and provide an interface for user configuration of switch 200. In general, software portion 220 may implement the functions of the switch 200 that are either related to control or that can be implemented in the "slow path" through switch 200. Software portion 220, although shown as a single abstract block 220 in FIG. 2, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memory (RAM), read-only memory (ROM), or another type of dynamic or static storage device that may store information and instructions for execution by processors 222.

Hardware portion 230 may include circuitry for efficiently processing data units received by network device 200. Hardware portion 230 may include, for example, logic, such as an application specific integrated circuit (ASIC), a field programmable gate array (FPGA), and/or a ternary content-addressable memory (TCAM). Hardware portion 230 may, for example, receive incoming data units, extract header information for the data units, and process the data units based on the extracted header information.

Hardware portion 230 may particularly include a forwarding table 232 and a switch fabric 234. Forwarding table 232 may be used to lookup the appropriate output port for incoming data units. Forwarding table 232 may be updated based on the network protocols implemented by software portion 220. Based on the result of the lookup in forwarding table 232, the data unit may be switched to the appropriate output port through switch fabric 234.

Switch 200 may also include ports for receiving and transmitting data units. Input ports 250 and output ports 260 are particularly shown for switch 200.

It can be appreciated that although switch 200 is shown as including a software portion 220 and a hardware portion 230, switch 200 may, in some implementations, be implemented entirely through software.

Figure 3:
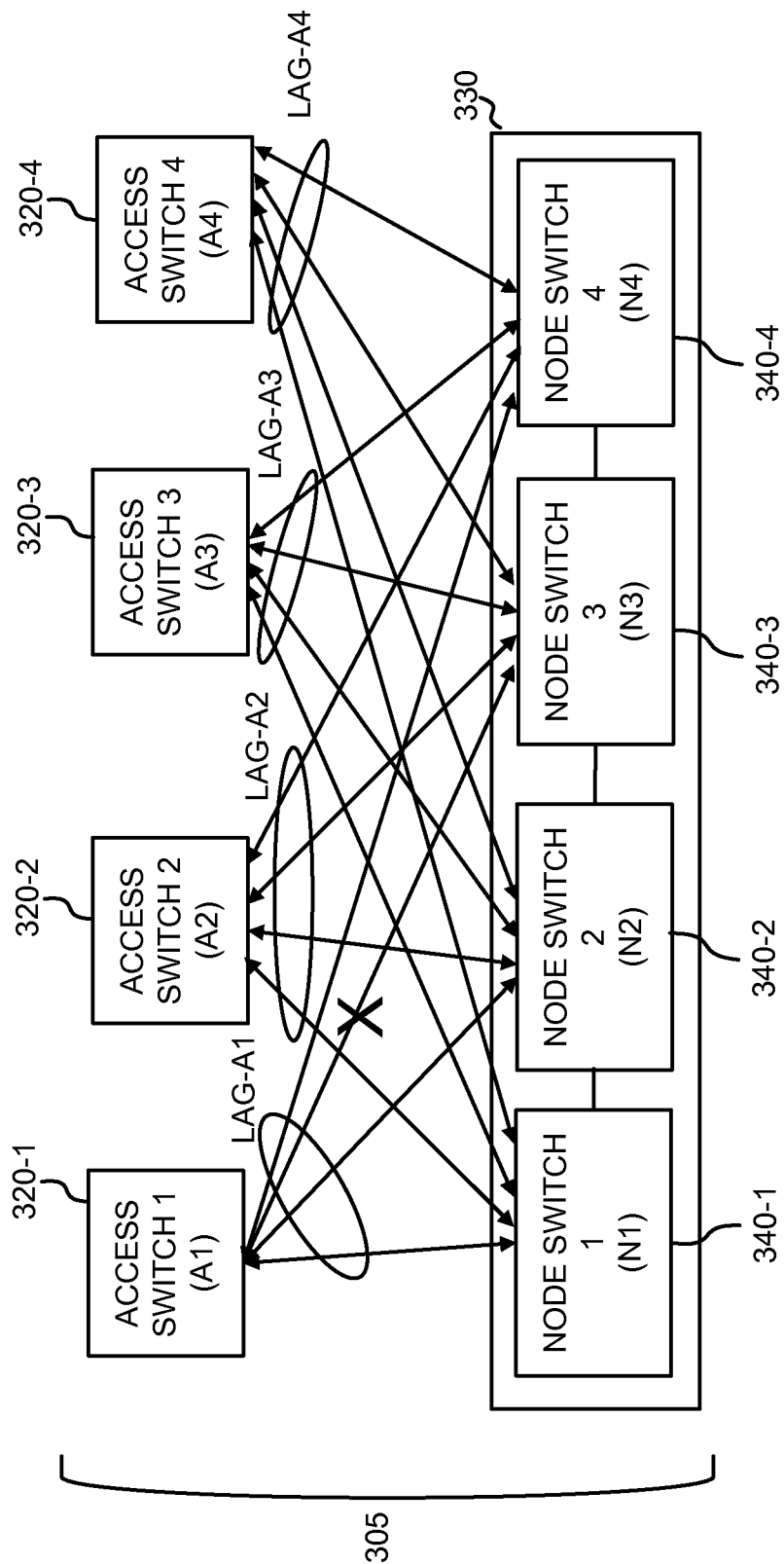
FIG. 3 is a diagram illustrating an exemplary implementation of a switching system.

FIG. 3 is a diagram illustrating an exemplary implementation of a switching system similar to switching system 105, labeled as switching system 305. In this example, switching system 305 may include four access switches 320-1 through 320-4 (collectively referred to as "access switches 320" and singularly as "access switch 320"), which may also be referred to as A1, A2, A3, and A4, respectively. Switching system 305 may also include a chassis 330 that includes four aggregation (node) switches 340-1 through 340-4 (collectively referred to as "node switches 340" and singularly as "node switch 340"), which may also be referred to as N1, N2, N3, and N4, respectively. Access switches 320, chassis 330, and node switches 340 may include the features described above in connection with access switches 120, chassis 130, and node switches 140, respectively (FIG. 1).

As shown, a network link may connect each access switch 320 to each node switch 340. Additionally, links may connect neighboring ones of node switches 340. The link between access switch A1 and node N1 will be referred to as link A1N1. Similar notation may be used to refer to the other links shown in FIG. 3.

A network discovery protocol may be used to allow switches 320 and 340 to determine the output port corresponding to the MAC/VLAN destination values that that are received with incoming data units. For example, when a data unit includes a destination MAC/VLAN address that is not known in forwarding table 232 of the receiving switch, the receiving switch 320 or 340 may flood the data unit to all of its output ports. A protocol such as a Spanning Tree Protocol (STP) may be used to ensure a loop-free topology for the network. For STP to be able to function properly, each access switch 320 may be limited to one logical link to chassis 330. To allow STP to function, multiple links from an access switch 320 may be logically combined through link aggregation.

Aggregated links are shown in FIG. 3 as LAG-A1 (the links from access switch A1), LAG-A2 (the links from access switch A2), LAG-A3 (the links from access switch A3), and LAG-A4 (the links from access switch A4). For each access switch 320, its corresponding LAG is a logical link that includes a number of member links. The member links for LAG-A1, for example, may include A1N1, A1N2, A1N3, and A1N4. From the point of view of A1, links A1N1, A1N2, A1N3, and A1N4 are encapsulated as the single link LAG-A1. When a data unit is destined for a logical link, the access switch may select one of the members of the logical link over which the data unit is actually sent. For example, a hash may be performed based on the data unit to select a member link over which to forward the data unit.

Assume that link A1N3 in switching system 305 goes down (shown by an X in FIG. 3). Further, assume that a packet is received at A2 and is destined for a device connected to A1. In this situation, access switch 320-2 may lookup the MAC address of the incoming data unit to determine that LAG-A2 corresponds to the data unit. Since LAG-A2 includes the member A2N3, the data unit may be switched to node switch 340-3 (N3). Because link A1N3 is down, however, the data unit cannot be forwarded directly from N3 to A1. Instead, N3 may first forward the data unit to one of its neighbor switches N2 or N1 over the links connecting node switches 340 to one another. Ideally, for efficient switching at chassis 330, the data unit should not traverse these intra-chassis links. In the following sections, techniques are described that allow access switches to gather information so that an inbound access switch does not forward to a chassis switch which cannot directly forward to an outbound access switch.

Operation of the Switching System

Figure 4:
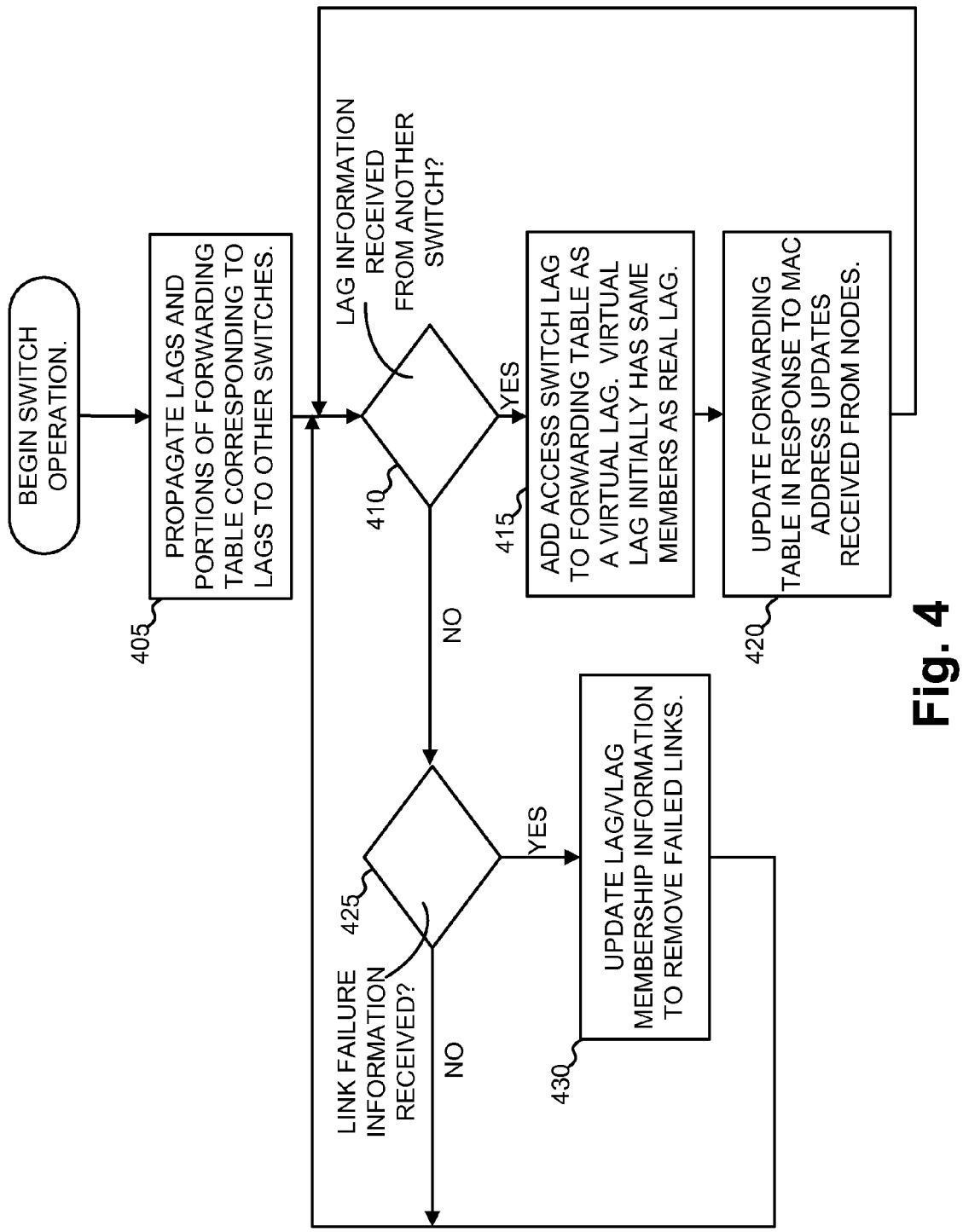
FIG. 4 is a flow chart illustrating exemplary operations of a switch.

FIG. 4 is a flow chart illustrating exemplary operations of a switch, such as one of access switches 320, consistent with aspects described herein. An access switch 320 may propagate information describing a LAG associated with the access switch 320 to other switches in switching system 305 (block 405). Portions of a forwarding table corresponding to the LAG may also be propagated to the other access switches (block 405). This information can be propagated through switching system 305 in a number of ways. For example, a protocol such as a Link Layer Discovery Protocol (LLDP) may be used. LLDP is a known protocol for network devices to advertising their identities and capabilities on a local network. Alternatively, other known or proprietary protocols may be used. In one implementation, the LAG information may be propagated through node switches 340 to access switches 320.

If LAG information propagated in block 405 is received at access switches 320 (block 410—YES), access switch 320 may add the LAG information to its forwarding table (block 415). The received LAGs are not the "real" LAGs for the access switch and will be referred to herein as virtual LAGs (VLAGs). The members for each VLAG may be initially set to be the same as for the real LAG for access switch 320 (block 415).

FIG. 5 is a diagram conceptually illustrating a portion of an exemplary forwarding table 500 for an access switch, such as access switch 340-2 (A2). Forwarding table 500 may generally store forwarding information for incoming data units. In layer 2 networks, data units may include a MAC address. The MAC address, in combination with a VLAN identifier, may specify the output port for the data unit. The VLAN identifier may not be relevant to the switching described herein, and accordingly, only the MAC address is shown in forwarding table 500.

Each entry in forwarding table 500 may relate a MAC address to an output identifier in access switch A2. The output identifier may be specified as, for example, a physical port (i.e., a single output link) or as an aggregated link (LAG) or VLAG. Each LAG link may include one or more member links, which may each correspond to a particular output port. When a LAG link is the output link, access switch A2 may choose one of the members of the LAG at which to forward the data unit. The member may be chosen, for example, based on a hash of header information in the data unit.

As shown in forwarding table 500, a number of MAC addresses 505, 510, 515, and 520 may each correspond to destination information. Some of the MAC addresses, such as MAC addresses 505 and 515, may be destined for a single output port (link) at access switch A2. These may correspond to other computing devices 110 connected directly to access switch A2. For destination devices connected to other switches, however, the destination may be one that is reached over a lag, such as LAG-A2. MAC addresses 510 and 520, for example, are addresses that correspond to LAG-A2. The members of LAG-A2 are shown in brackets and include: link A2N1, link A2N2, link A2N3, and link A2N4.

The LAGs received from access switches A1, A3, and A4 are shown in forwarding table 500 as VLAG-A1, VLAG-A3, and VLAG-A4. Initially, the members of the VLAGs may be set to be the same as the real LAG (i.e., LAG-A2). Further, forwarding table 500 may be initially learned based on the real LAG. That is, the VLAGs may not initially be associated with any MAC addresses. Although VLAG-A1, VLAG-A3, and VLAG-A4 are shown in forwarding table 500 as not corresponding to any MAC address, it can be appreciated that, in practice, the VLAG may not be included in the forwarding table until it is associated with at least one MAC address.

Referring back to FIG. 4, access switches 320 may also receive forwarding table updates corresponding to the VLAGs and may correspondingly update the forwarding table (block 420). For access switch A2, for example, assume that an update is received from a node switch 340, indicating that MAC address 520 corresponds to VLAG-A1. In other words, MAC address 520 may refer to a computing device 110 that is connected to access switch A1. In this situation, forwarding table 500 may be updated to reflect that MAC address 520 corresponds to VLAG-A1. FIG. 6 is a diagram conceptually illustrating a portion of exemplary forwarding table 600 after updating MAC address 520 in forwarding table 500 to correspond to VLAG-A1. As shown, the destination for MAC address 520 is now VLAG-A1 instead of LAG-A2.

Initially, because the membership for VLAG-A1 is equal to the membership of LAG-A2, the change in destination for MAC address 520 may have no practical affect on the operation of access switch A2. As will be described in more detail below, however, the members of LAG-A1, VLAG-A1, VLAG-A3, and VLAG-A4 may be separately updated in response to link status changes. By associating MAC address 520 with VLAG-A1, changes in the member links of VLAG-A1 may be used to avoid sending data units to a node switch 340 that is not directly connected to access switch A1.

Referring back to FIG. 4, it may be determined if link failure information is received by access switches 320 (block 410—NO; and block 425). Node switches 340 may, for example, detect failures on any of the individual links with access switches 320. In response, node switches 340 may propagate information describing the failed link to each of access switches 320. Also, when a previously failed switch comes back online, node switches 340 may also propagate this information to access switches 320. Alternatively, access switches 310 may detect link failure and propagate the link failure to other access switches.

If link failure information is not received by access switches 320 (block 425—NO), operations may return to block 410. If link failure information is received by access switches 320 (block 425—YES), forwarding tables in access switches 320 may be updated to reflect the received link failure information (block 430). LAG/VLAG memberships may be updated to remove failed links. More specifically, for a failed link between access switch X and node switch Y, each other access switch 320 may modify the members of VLAG-AX to remove the members that include node Y. In the example of forwarding table 600, assume link A1N3 goes down and notification of this failure is received by access switch A2. In this case, X=1 and Y=3, so VLAG-A1 may be modified in access switch A2 to remove members including node 3 (i.e., A2N3). FIG. 7 is a diagram conceptually illustrating a portion of exemplary forwarding table 700 after updating the memberships of VLAG-A1 in forwarding table 600. As shown, VLAG-A1 now includes the members: A2N1, A2N2, and A2N4. Accordingly, a data unit received at access switch A2 and destined for MAC address 520 (which corresponds to a computing device connected to access switch A1) may be switched to either node N1, N2, or N4 on its way to access switch A1. Link A1N3 will thus not be used when switching this data unit to access switch A1.

Figure 8:
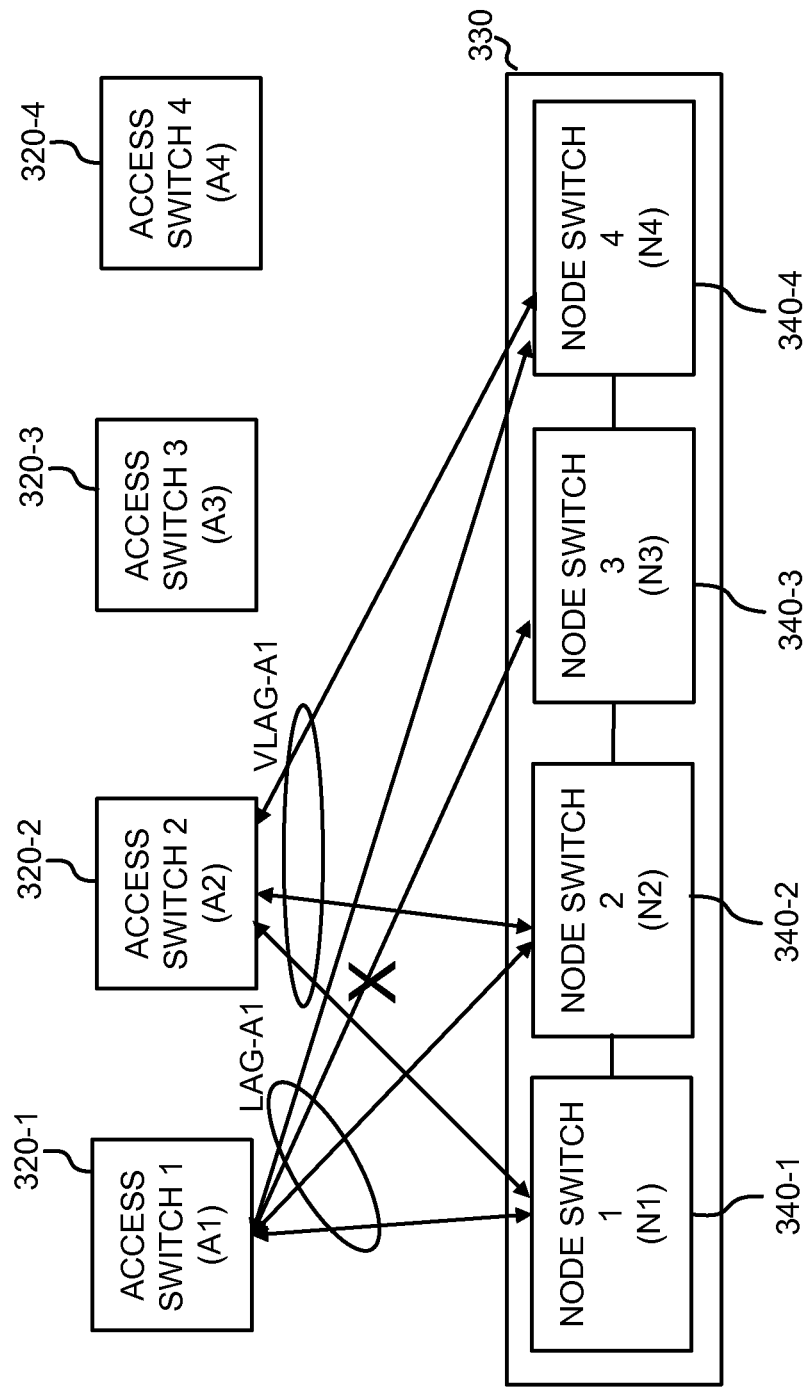
FIG. 8 is a diagram illustrating operation of access switches and node switches in handling a failed link.

FIG. 8 is a diagram illustrating operation of access switches 320 and node switches 340 in handling a failed link, such as exemplary failed link A1N3, as described above. As shown, link A1N3 is no longer operational. VLAG-A1, at switch A2, is illustrated after the failed link information is propagated to A2. At this point, VLAG-A1 does not include A2N3. Data units received at A2 and destined for a device connected to A1 will use VLAG-A1. Because VLAG-A1 does not include member A2N3, the data unit will be routed to one of the other node switches (N1, N2, or N3), which are all still directly connected to A1. Without using an updated VLAG, as described above, the data unit may be switched to N3 and potentially require the data unit to then be switched to N2 or N4 before being switched to A1.

In some implementations, when a link that was not connected comes back online, the access switch 320 or node switch 340 that is connected to the link may propagate the re-establishment of the link to the other access switches 320. These access switches may then re-add the link to the appropriate VLAGs.

CONCLUSION

As described above, access switches in a switching network may keep track of VLAGs corresponding to other access switches in the switching network. Members in the VLAGs may be removed to reflect failed or non-active links associated with the other access switches. By forwarding links based on the VLAGs, extra switching operations in the switch aggregation layer may be avoided.

While a series of operations has been described with regard to FIG. 4, the order of the operations may be varied in other implementations consistent with the invention.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a first device, that information regarding a virtual aggregated link, that represents a plurality of possible output links associated with a second device, is not received;
   determining, by the first device and after determining that the information regarding the virtual aggregated link is not received, that information regarding a failed link between the second device and a third device is received;
selecting, by the first device and after determining that the information regarding the failed link is received, particular links of the plurality of possible output links based on the information regarding the failed link between the second device and the third device,
the particular links connecting the first device to the third device; and
updating, by the first device, membership information of the virtual aggregated link to remove the particular links from the virtual aggregated link.

2. The method of claim 1, further comprising:
receiving the information regarding the failed link from an aggregation switch connected to the first device,
the third device including the aggregation switch.

3. The method of claim 1, further comprising:
changing, based on the information regarding the failed link associated with the second device, an output identifier from identifying an aggregated link to identifying the virtual aggregated link,
the aggregated link representing another plurality of possible output links.

4. The method of claim 1, further comprising:
storing, in a forwarding table, a particular entry that includes an output identifier for the first device,
the output identifier including the information regarding the virtual aggregated link.

5. The method of claim 4, further comprising:
receiving a data unit,
the data unit including a destination address corresponding to an intended destination for the data unit, and
the particular entry defining a correspondence between the destination address and the output identifier; and
transmitting the data unit.

6. The method of claim 1, further comprising:
receiving a data unit,
the data unit including a destination address corresponding to an intended destination for the data unit; and
switching, based on the destination address, the data unit to one of the plurality of possible output links.

7. The method of claim 1, where the first device and the second device include Layer 2 network access switches.

8. A first device comprising:
one or more processors to:
determine that information regarding a virtual aggregated link, that represents a plurality of possible output links associated with a second device, is not received;
determine, after determining that the information regarding the virtual aggregated link is not received, that information regarding a failed link between the second device and a third device is received;
select, after determining that the information regarding the failed link is received, particular links of the plurality of possible output links based on the information regarding the failed link between the second device and the third device,
the particular links connecting the first device to the third device; and
remove the particular links from the virtual aggregated link.

9. The first device of claim 8, where the first device and the second device include Layer 2 network access switches.

10. The first device of claim 8, further comprising:
a data structure to store an entry that includes the information regarding the virtual aggregated link.

11. The first device of claim 10, further comprising
an input port to receive a data unit,
the data unit including a destination address corresponding to an intended network destination for the data unit, and
the entry defining a correspondence between the destination address and the information regarding the virtual aggregated link.

12. The first device of claim 8, where the third device is an aggregation switch in a switching system.

13. The first device of claim 8,
where the one or more processors are further to:
receive the information regarding the failed link from an aggregation switch that is connected to the failed link, and
where the third device is the aggregation switch.

14. The first device of claim 8, where, when removing the particular links, the one or more processors are to:
update membership information of the virtual aggregated link to remove the particular links from the virtual aggregated link.

15. A non-transitory computer-readable storage medium storing instructions, the instructions comprising:
one or more instructions that, when executed by at least one processor of a first device, cause the at least one processor to:
determine that information regarding a virtual aggregated link that represents a plurality of possible output links associated with a second device, is not received;
determine, after determining that the information regarding the virtual aggregated link is not received, that information regarding a failed link between the second device and a third device is received;
select, after determining that the information regarding the failed link is received, particular links of the plurality of possible output links based on the information regarding the failed link between the second device and the third device,
the particular links connecting the first device to the third device; and
remove the particular links from the virtual aggregated link.

16. The non-transitory computer-readable storage medium of claim 15, where the instructions further comprise:
one or more instructions that, when executed by the at least one processor, cause the at least one processor to:
create an aggregated link that represents another plurality of possible output links; and
implement a data structure that stores correspondences between addresses and at least one of the aggregated link or the virtual aggregated link.

17. The non-transitory computer-readable storage medium of claim 15, where the instructions further comprise:
one or more instructions that, when executed by the at least one processor, cause the at least one processor to:
receive a data unit;
determine an output port for the data unit based on a lookup into a data structure,
the data structure including information regarding correspondences between one or more addresses and the virtual aggregated link; and
output the data unit via the output port.

18. The non-transitory computer-readable storage medium of claim 15, where the third device is an aggregation switch.

19. The non-transitory computer-readable storage medium of claim 15,
   where the instructions further comprise:
      one or more instructions that, when executed by the at least one processor, cause the at least one processor to:
         change, based on the information regarding the failed link associated with the second device, an output identifier from identifying an aggregated link to identifying the virtual aggregated link, and
   where the aggregated link represents another plurality of possible output links.

20. The non-transitory computer-readable storage medium of claim 15, where the first device and the second device include Layer 2 network access switches.

* * * * *